United States Patent [19]

Watanabe et al.

[11] Patent Number: 5,042,059
[45] Date of Patent: Aug. 20, 1991

[54] OPTICAL ELEMENTS FOR RADIATION COMPRISING GRAPHITE FILMS

[75] Inventors: Kazuhiro Watanabe, Kawasaki; Mutsuaki Murakami, Tokyo; Susumu Yoshimura, Yokohama, all of Japan

[73] Assignees: Matsushita Electric Industrial Co., Ltd.; Research Development Corporation of Japan, both of Japan

[21] Appl. No.: 316,055

[22] Filed: Feb. 27, 1989

[30] Foreign Application Priority Data

Feb. 25, 1988 [JP] Japan .................. 63-42677
May 2, 1988 [JP] Japan .................. 63-109354

[51] Int. Cl.⁵ .................................. G21K 1/06
[52] U.S. Cl. .................................. 378/145; 378/84; 378/85
[58] Field of Search .............. 378/145, 84, 85, 82, 378/161, 156; 423/448, 449, 460; 528/481, 490

[56] References Cited

U.S. PATENT DOCUMENTS 4,749,514  6/1988  Murakami et al. ............ 423/449
4,788,703  11/1988  Murakami et al.
4,842,665  6/1989  Taguchi et al. ............... 378/84

FOREIGN PATENT DOCUMENTS 0203581  12/1986  European Pat. Off.
0219345  4/1987  European Pat. Off.

OTHER PUBLICATIONS

Applied Physics Letters, vol. 48, No. 23, Jun. 1986, pp. 1594–1596; M. Murakami et al.: "High-Quality Pyrographite Films".

Synthetic Metals, vol. 18, Feb. 1987, pp. 497–502, Elsevier Sequoia, Lausanne; T. Onishi et al.: "Preparation of Graphite Film by Pyrolysis of Polymers".

Primary Examiner—Carolyn E. Fields
Assistant Examiner—David P. Porto
Attorney, Agent, or Firm—Lowe, Price, LeBlanc & Becker

[57] ABSTRACT

Optical elements for radiation comprising a graphite film obtained from a film of a polymer such as polyphenylene oxadiazole, polybenzothiazole, polybenzobisthiazole, polybenzooxazole, polybenzobisoxazole, polypyromellitimide, polyphenylene isophthalamide, polyphenylene benzoimidazole, polyphenylene benzobisimidazole, polythiazole or poly-p-phenylene-vinylene. The graphite film is obtained by pyrolysis of the polymer film at 2800° C. or higher at a pressure of not lower than 4 kg/cm² in vacuum or in an inert gas. Alternatively, the element may be made of a graphite film obtained from the polymers mentioned above and intercalated with a metal halide. The intercalated films are readily bonded by pressing in the form of a thick sheet or block. Still alternatively, the graphite films and the intercalated films may be superposed alternately and bonded by pressing, or the intercalated films may be sandwiched between the graphite films and bonded together to form a thick sheet or block. The optical element has application as a lens, monochromater, filter or analyzer for radiations.

25 Claims, 3 Drawing Sheets

OPTICAL ELEMENTS FOR RADIATION COMPRISING GRAPHITE FILMS

BACKGROUND OF THE INVENTION

1. Field of The Invention

This invention relates to optical elements for radiation which are particularly useful for X-ray spectroscopy, neutron spectroscopy and the like spectroscopic analyses and which are made of artificial graphite.

2. Description of The Prior Art

As is known in the art, optical elements which are usually used in optical instruments for X-rays such as X-ray spectroscopes, X-ray microscopes and the like make use of the Bragg reflection of crystals although, in a specific case, total reflection of X-rays passing very closely to a reflection surface may be utilized. The crystals used for the above purpose should have a complete crystal structure and should be obtained in a desired size. Moreover, such crystals should have a small absorption coefficient for X-rays and should have appropriate flexibility when applied to curved spectroscopes.

One type of crystal which satisfies the above requirements is graphite. Graphite has a small absorption coefficient against X-rays and has been often employed as an optical element for X-rays. However, a single crystal of natural graphite with a large area cannot be obtained. Accordingly, it is usual to artificially obtain graphite crystals by hot processing of a pyrolytic deposit of hydrocarbon. For instance, there is known as artificial graphite compression annealed pyrographite (CAPC) or high-oriented pyrographite (HOPG) commercially sold from Union Carbide Inc. These graphite products are produced by pyrolyzing a gaseous hydrocarbon at a temperature of about 1000° C. to obtain graphite crystals and annealing the crystals at 3600° C. over a long time of, say, several weeks under pressure.

As is known, the Bragg equation is expressed as $2d \sin \theta = \lambda$ where d is the distance between the successive lattice planes, $\theta$ is a reflection angle, and $\lambda$ is a wavelength of the reflected X-ray. It is stated that with the graphite of Union Carbide Inc., where a monochromatic X-ray, e.g. a K $\alpha$ line of Cu radiation ($\lambda = 1.5418$ Å), reflects on the (002) plane, the distance between the lattice planes, d, is close to the distance between the single crystals of the graphite, i.e. d=3.354 Å. The half-value width of the reflection line, $\Delta\delta_{002}$, is stated to be about 0.7°.

However, these artificial graphite products involve the problem that annealing under very high temperature and long time conditions at a high pressure is required as mentioned above, thus the production process being complicated with high production costs.

For focussing X-rays, it is usual to appropriately bend a single crystal plate of silicon or to form a curved lens of graphite by machining. These are also complicated in the fabrication with high production costs.

For the purpose of providing artificial graphite sheets with a large area which are simply fabricated without resorting to complicated procedures such as compression annealing and are thus inexpensive but which have complete crystallinity and good flexibility, we proposed in U.S. Pat. No. 4,788,703 (corresponding European Patent Laid-open Application No. 219,345) graphitization of a polyphenylene oxadiazole (POD) by treatment at 2800° C. or higher. The graphitized sheet was flexible and was found to be suitable as a radiation optical element such as for X-rays.

The graphitized POD obtained by treating starting POD at a normal pressure at temperatures not lower than 2800° C. has the following physical properties.

(1) Reflection lines against CuK $\alpha$ (1.5418 Å) are those corresponding only to (002), (004) and (006) planes.

(2) The reflection angle ($2\theta$) at the (002) plane is 26,576° and the distance between the lattice planes, d, is 3,354 Å, which were in coincidence with those of the single crystal of graphite.

(3) The half-value widths of the reflection line (having a center at $2\theta = 26.576°$) at the (002) plane were, respectively, 2.0° and 0.14° for thermal treatment at temperatures of 2800° C. and 3000° C.

(4) The graphitized POD had flexibility and the area or size of the product could be increased as desired depending upon the area or size of a starting POD sheet and the size of a thermal treatment furnace.

The radiation optical element using the graphitized POD sheet exhibit good characteristics when applied as an X-ray lens, an X-ray monochromater or an optical element for neutron spectroscopy. However, the graphitized POD has the problem that a rocking characteristic which is the most important characteristic when it is applied as a radiation optical element is not satisfactory. For instance, the rocking characteristic of a graphitized POD product treated at 3000° C. is 6.9°, which is unsatisfactory for use as a radiation optical element although such a characteristic may be further improved by hot pressing.

Moreover, the graphitized POD is also unsatisfactory with respect to the reflectivity of radiation. The radiation reflectivity has the relation with the crystallinity along the c axis of graphite. It is known that if the crystallinity along the c axis is too good, an X-ray once passing into the crystal will suffer internal reflection, causing a total reflectivity to be lowered. In order to realize a good reflection efficiency, the crystallinity along the c axis of graphite should not be too good or too bad but is required to have an appropriate value. The graphitized POD is good in crystallinity along the c axis, which adversely influences the reflection efficiency on radiation.

In recent years, X-rays or so-called soft X-rays having a wavelength of from approximately 9 or 10 Å to several hundreds angstroms are being utilized in the field of lithography of semiconductor, on which industrial importance is placed. Among soft X-ray elements dealing with an X-ray having about 10 angstroms to several hundreds angstroms, those elements using diffraction should have a lattice distance, contributing to the diffraction, which corresponds to an intended wavelength, say approximately 10 angstroms to several hundreds angstroms. With graphite currently used as the X-ray element, the lattice distance contributing to the diffraction is 3.354 Å. Accordingly, such graphite cannot be used for the purpose of reflection of soft X-rays.

SUMMARY OF THE INVENTION

It is therefore an object of the invention to provide an optical element for radiation which can solve the drawbacks of the prior art elements and can be simply manufactured with low production costs.

It is another object of the invention to provide a radiation optical element which has better rocking and reflectivity characteristics than known elements using graphite from polyphenylene oxadiazole set forth before.

It is a further object of the invention to provide an optical element for soft X-rays whose wavelength is in the vicinity of 10 angstroms as well as hard X-rays.

It is a still further object of the invention to provide a radiation optical element which comprises a graphite sheet having a desired thickness capable of dealing with not only X-rays, but also neutron rays.

It is another object of the invention to provide a radiation optical element made of a graphitized product of a polymer in the form of a sheet which may be used in combination with a suitable substrate.

The optical element for radiation of the present invention is adapted for use in a radiation optical system which includes a radiation source capable of emitting a radiation and a means for receiving the radiation generated from the radiation source through the optical element. The optical element may be used as a convergent lens, a monochromator, an analyzer, a filter or the like means for radiations. The radiations may include X-rays including so-called soft and hard X-rays, neutron rays and the like.

In accordance with one embodiment of the invention, there is provided a radiation optical element which comprises a graphite film or sheet obtained by thermally treating or pyrolyzing a film of a polymer in vacuum or in an inert gas at a temperature of not lower than 2800° C. at a pressure of not lower than 4 kg/cm$^2$. The polymer should be a member selected from polyphenylene oxadiazole, polybenzothiazole, polybenzobisthiazole, polybenzooxazole, polybenzobisoxazole, polypyromellitimide, polyphenylene-isophthalamide, polyphenylene-benzoimidazole, polyphenylene-benzobisimidazole, polythiazole and poly-p-phenylene-vinylene. The resultant graphite film is significantly improved in rocking characteristic and reflection efficiency. The polyphenylene oxadiazole is included as the starting polymer. As will become apparent from examples, the graphite film obtained from the polyphenylene oxadiazole (POD) is better in the characteristic and efficiency than a known graphite film of POD obtained by thermal treatment at temperatures not lower than 2800° C. at a normal pressure. The process of pyrolysis of POD under a certain pressure has not been known as providing a final graphite product of better characteristic properties. If a graphite sheet or block having a desired thickness is necessary, such a sheet can be obtained by pressing a plurality of polymer films or a plurality of granite films at a final temperature of not lower than 2800° C. for a sufficient time.

In accordance with another embodiment of the invention, there is also provided a radiation optical element which comprises a graphite film interacted or intercalated with a metal halide, thereby forming a film of a metal halide-intercalated graphite compound. The graphite film is obtained from a polymer which is thermally treated in the same manner as in the first embodiment. The polymer used is a member selected from those defined in the first embodiment. When a plurality of the intercalated graphite films are pressed, a block or sheet of a desired thickness can be readily obtained because of the good adhesiveness of the intercalated graphite films. This intercalated film is flexible and can be conveniently provided on or along a curved surface.

In accordance with a further embodiment of the invention, there is also provided a radiation optical element which comprises at least one graphite film obtained in the first embodiment and at least one metal halide intercalated graphite film which are superposed and press bonded. In this embodiment, it is possible and even usual to alternately superpose a number of graphite films and a number of the intercalated graphite films or to sandwich a number of the intercalated graphite films between two graphite films with or without further superposition of a plurality of the sandwiched sheets thereby forming a block of a desired thickness in the order of millimeters.

In all the embodiments, the film sheets or blocks may be used as they are. If a thin graphite or intercalated graphite compound film is used, it is favorable to form it on a substrate so as to impart mechanical strength thereto.

DETAILED DESCRIPTION OF THE INVENTION

Figure 1:
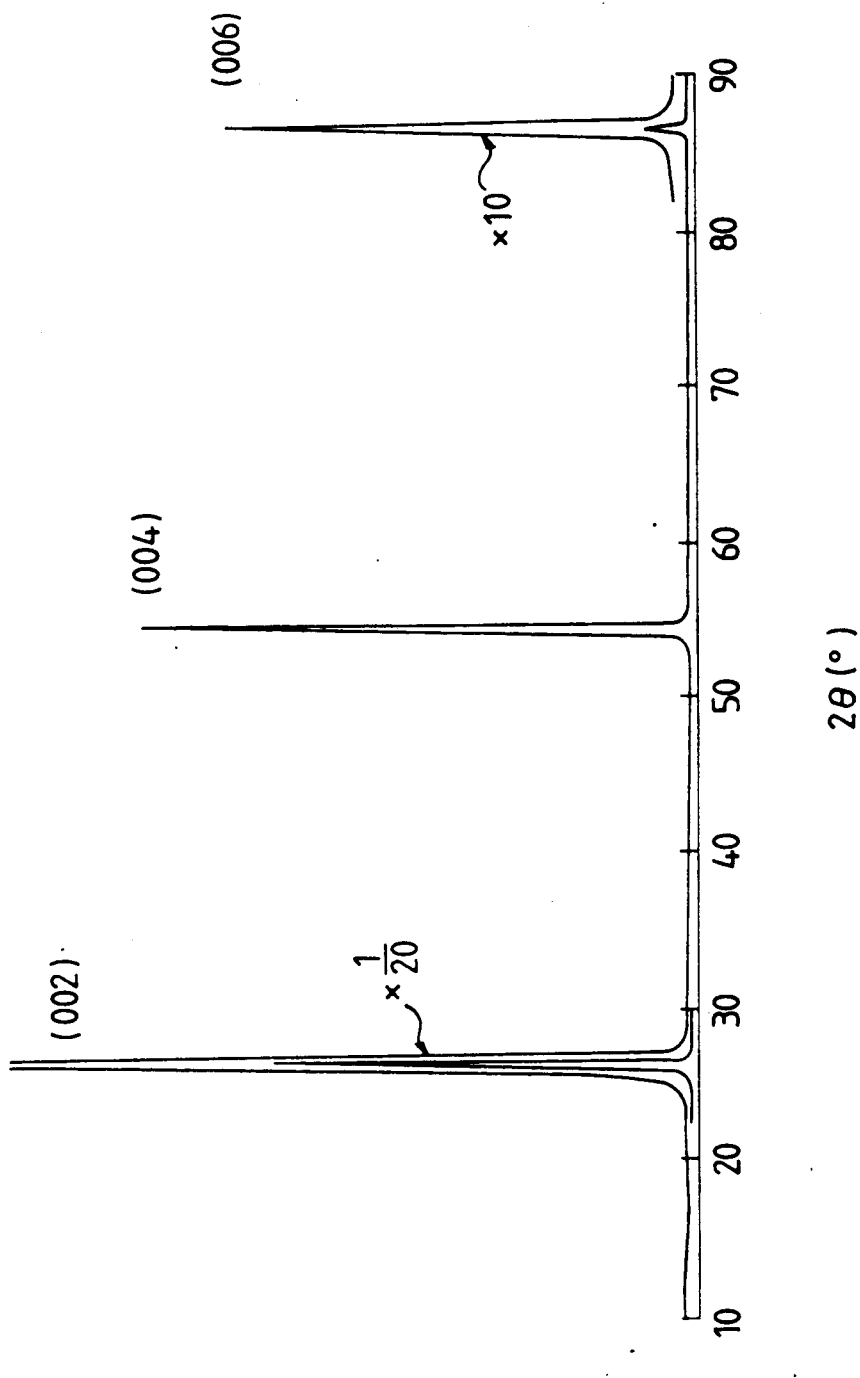
FIG. 1 is an X-ray diffraction pattern of a known radiation optical element of graphite for K α line of Cu radiation.

It is known that when polymers are pyrolyzed, they are carbonized in their original form. This is a good procedure of fabricating a carbonaceous material with a large area and good flexibility. However, the carbonaceous material obtained by the above procedure has, in most cases, a structure which is completely different from that of graphite. Polyphenylene oxadiazole which has been set forth before is a material which is exceptionally converted into graphite of good properties.

We have made studies on a number of polymer materials including POD so as to obtain graphite films which have better rocking and reflectivity characteristics than the known graphite film obtained from POD.

According to one embodiment of the invention, there is provided a radiation optical element which comprises a graphite film obtained by thermally treating a specific type of polymer at a temperature of not lower than 2800° C. under a pressure of not lower than 4 kg/cm$^2$. The starting polymer materials useful in the present invention include, for example, polyphenylene oxadiazole, polybenzothiazole, polybenzobisthiazole, polybenzooxazole, polybenzobisoxazole, polypyromellitimide, polyphenylene-isophthalamide, polyphenylene-benzoimidazole, polyphenylene-bisimidazole, polythiazole and poly-p-phenylene-vinylene. In view of the characteristic properties and the ease in graphitization, polyphenylene oxadiazole and polypyromellitimide are preferred. These polymers are now commercially available and include polymers of isomers of the respective monomers. For instance, polythiazole used herein includes polymers of 1,2 and/or 1,3-isomer. These polymers are subjected to the thermal treatment or pyrolysis in the form of a film or sheet preferably having a thickness of from 1 to 400 micrometers, preferably from 4 to 200 micrometers in order to facilitate graphitization efficiently although the film having a thickness outside the above range may be used.

The thermal treatment or pyrolysis should be effected at a temperature of not lower than 2800° C. under a pressure of not lower than 4 kg/cm$^2$. Higher temperature and high pressures are conductive to better rocking and reflectivity characteristics. In view of economy and ease in handling, the upper limit of the temperature is preferably 3600° C. and the upper limit of the pressure is preferably about 500 kg/cm$^2$. Depending upon the type of polymer and the thickness of polymer film, the time required to complete graphitization of the film is usually from 10 to 180 minutes. A longer time may be used but further merits cannot be expected.

The thermal treatment should be effected in vacuum or in a gas inert to the polymer used or the graphitization reaction. Such an inert gas may be argon, helium, nitrogen and the like.

The resultant graphite films exhibit better rocking and reflectivity characteristics as will be particularly described in examples.

As will become apparent from Example 1 appearing hereinafter, the pyrolysis under a pressure not lower than 4 kg/cm$^2$ can provide a graphite film of polyphenylene oxadiazole whose characteristic properties including a rocking characteristic and a reflection efficiency are greatly improved over those of the known graphite film of polyphenylene oxadiazole. This is considered to result from the difference in pyrolyzing conditions.

Figure 2:
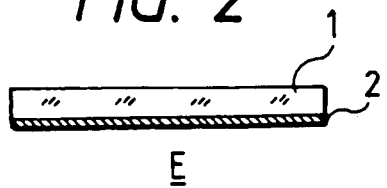
FIG. 2 is a schematic side view of a radiation optical element according to one embodiment of the invention.

The graphite film obtained in this embodiment may be used, as it is, as a radiation optical element if desired. However, it is preferred to provide the graphite film on a suitable support as is particularly shown in FIGS. 2 and 3. In FIG. 2, there is shown a radiation optical element E including a flat smooth support 1 and a graphite film 2 formed on one side of the support 1. This element E may be used as an X-ray monochromator. The element E of FIG. 3 includes a curved smooth support 1' and a graphite film 2' formed on the inner side of the support 1' as viewed in the figure. This element serves as a kind of convergent lens.

The support in these embodiments may take any forms if required and may be cylindrically or arbitrarily curved or flat. The support is usually made of glass, metals, ceramics and the like. The graphite film is attached to a flat or curved support by means of an adhesive which does not adversely influence the element and particularly the graphite film. Examples of such adhesives include epoxide compounds, cyanoacrylates, and the like.

Figure 3:
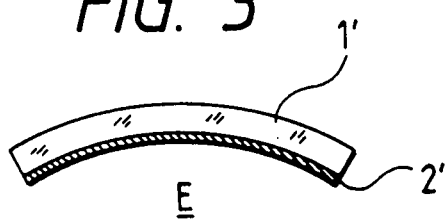
FIG. 3 is a schematic side view of a radiation optical element according to another embodiment of the invention.

The graphite films set forth above have good rocking and reflectivity characteristics and can be fabricated in a desired size with good flexibility. Accordingly, the graphite film products obtained by the above procedures can be applied as various optical elements including not only the lens and monochromator as shown in FIGS. 2 and 3, but also analyzers and filters. In practical applications, a graphite film having a thickness of several to several tens micrometers are suitable for X-rays with a wavelength of approximately several to about 8 or 9 angstroms. For X-rays with a shorter wavelength, the graphite should favorably be in the form of a sheet or block having a thickness of not less than 0.5 mm. Moreover, for monochromaters or filters, for neutron rays, 2 mm to 50 mm thick graphite blocks are necessary. In order to obtain a graphite sheet or block of a desired thickness, a plurality of polymer films each having 1 to 400 micrometers are stacked and thermally treated (a) at a temperature up to 2800° C. at a pressure of not higher than 20 kg/cm$^2$ and then (b) at a temperature of not lower than 2800° C. at a pressure not lower than 20 kg/cm$^2$. Alternatively, a plurality of graphite films may be pressed at a temperature not lower than 2800° C. at a pressure not lower than 20 kg/cm$^2$, thereby obtaining a block of a desired thickness. In the former case, the thermal treatment (a) is effected at a heating rate of several to several tens degree/minute. The treatment (b) is conducted over 10 to 180 minutes. The pressures in the respective steps (a) and (b) may be constant for each step. Preferably, the pressure within a defined range is continuously varied and kept at a maximum level and returned to an initial level, followed by repeating this cycle. For instance, the pressure up to 20 kg/cm$^2$ at temperatures lower than 2800° is imposed so that the pressure gradually increases from 0 to 20 kg/cm$^2$ in a given time. When it reaches a maximum level, the pressure is maintained for a given time and is subsequently returned to an initial level. This is repeated several to several tens times. Over 2800° C., the pressure imposed is gradually varied from 20 kg/cm$^2$ to an intended level in the same manner as set forth above. This is advantageous in that wrinkles as will be produced, more or less, during the thermal treatment can be substantially removed.

If a curved sheet is necessary, the thermal treatment may be effected in a mold capable of causing a desired curve of the sheet to be formed.

Graphite has a lattice distance of 3.354 angstroms and cannot thus be used as an optical element for soft X-rays as stated before. As a diffraction grating for a wavelength of soft X-rays, there are known thin films of organic compounds such as EDDT, ADP or KAP or multi-layered thin films which are obtained by alternately depositing carbon and tungsten, or silicon and nickel. However, with the organic compounds, thermal stability and reflection intensity are not satisfactory. On the other hand, the multi-layered films are very complicated in the fabrication procedure, coupled with another disadvantage that they cannot be applied to X-rays having a wavelength of not higher than 20 angstroms. More particularly, there is not known any film serving as a diffraction grating which exhibits good characteristics and are capable of being applied for soft X-rays having a wavelength of from about 10 to 20 angstroms.

According to another embodiment of the invention, the above problem can be solved by provision of a graphite film which is interacted with a metal halide to form a film of a metal halide-intercalated graphite compound where the metal halide is intercalated inbetween layer lattices of the graphite. The intercalation of a metal halide into graphite involves two types including a first stage intercalation wherein the metal halide is included in an individual space between any adjacent lattice layers of graphite. Another type includes a second stage intercalation wherein the metal halide is intercalated in every third space between lattice layers of graphite. The intercalation used herein means both types of intercalations.

The starting graphite film may be one which is obtained in the first embodiment. More particularly, a film or sheet of a polymer which is selected from those defined with respect to the first embodiment and including polyphenylene oxadiazole is subjected to thermal treatment at a temperature of not lower than 2800° C. either at a normal pressure or at a pressure of not lower than 4 kg/cm² in vacuum or in an inert gas.

The intercalated graphite compound film using a metal halide is generally obtained by a gas phase method, a solvent method or an electrolytic method. In the practice of the invention, the intercalated film is obtained either by a procedure wherein a graphite film and a metal halide are heated in a stream of a halogen such as Cl, Br, I or F at a temperature of from 200° to 500° C. for a time of from 5 to 10 days for the first stage intercalation and for a time of from 1 to 4 days for the second stage intercalation, or by a procedure wherein a graphite film and a metal halide are placed in a sealed glass and heated in vacuum under conditions indicated above. If the halogen stream is used, the halogen used should be a halogen of the metal halide used. For the first stage intercalation, a longer time is necessary.

The metal halides used to react with the graphite include, for example, $BCl_3$, $MgCl_2$, $AlCl_3$, $ScCl_3$, $TiCl_4$, $CrCl_3$, $MnCl_2$, $FeCl_3$, $CoCl_2$, $NiCl_2$, $CuCl_2$, $ZnCl_2$, $GaCl_3$, $YCl_3$, $NbCl_5$, $MoCl_5$, $RhCl_3$, $PdCl_2$, $CdCl_2$, $RuCl_3$, $ZrCl_4$, $InCl_3$, $HfCl_4$, $TaCl_5$, $WCl_6$, $ReCl_4$, $OsCl_4$, $PtCl_4$, $AuCl_3$, $HgCl_2$, $TlCl_3$, $BiCl_4$, $ICl$, $IBr$, $FeCl_2$, $BF_3$, $AlBr_3$, $SiF_4$, $TiF_4$, $FeBr_3$, $CuBr_2$, $PF_6$, $GaBr_3$, $NbF_5$, $MoF_6$, $CdBr_2$, $TaF_6$, $WF_6$, $OsF_3$, $AuBr_3$, $TlBr_3$, and mixtures thereof. Of these, $NiCl_2$ and $CuCl_2$ are preferred. Aside from the metal halides, alkali metals such as Na or K may be used to form an intercalated graphite compound. However, these intercalated compounds are unstable and are not suitable for the purposes of the invention.

The film of the intercalated graphite compound obtained in this manner has a high reflection efficiency for soft X-rays, a lattice distance larger than that of the graphite film, and high resistances to heat and moisture. In addition, the intercalated compound film is so high in flexibility that it can be bonded to a curved or flat support or substrate without breakage. For this purpose, an adhesive such as epoxide compounds, pitches and the like may be used. Thus, this film can be applied as an optical element such as a lens, monochromater, analyzer or filter similar to the graphite film of the first embodiment.

Moreover, the films of the intercalated graphite compound are readily self-bonded by pressing to form a block or sheet of a desired thickness.

The self-bonding property of the intercalated graphite compound film may be utilized in combination with graphite films in a further embodiment of the invention to make a thick film whose properties are predominant of those of the graphite films. The graphite film set forth before with respect to the first embodiment may, in some cases, involve a difficulty in making a thick film because of the generation of gases during the thermal treatment of polymer film. If a thick polymer film is pyrolyzed in order to obtain a thick graphite film, gases generated in the vicinity of or near the film surface may readily escape to outside. However, the gases generated around the inner portion of the film are difficult to escape and may be included in the inside. As the pyrolysis proceeds further, the gases increase in amount, which may eventually lead to cracking of the entirety of the film. Further, formation of a block or sheet of graphite films by pressing requires relatively severe thermal treating conditions as set out before.

For obtaining a thick sheet of block having graphite properties, adhesiveness of the films of the intercalated graphite compound can be conveniently utilized. This is described with reference to FIGS. 4 and 5.

Figure 4:
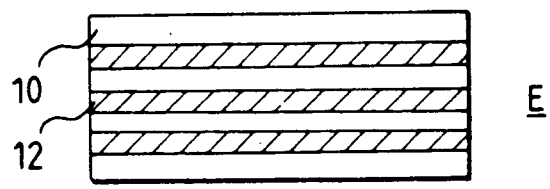
FIG. 4 is a schematic side view of a radiation optical element according to a further embodiment of the invention.
Figure 5:
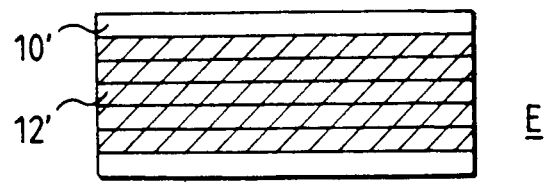
FIG. 5 is a schematic side view of a radiation optical element according to a still further embodiment of the invention.

In FIG. 4, there is shown an optical element E which includes graphite films 10 and intercalated graphite compound films 12 which are superposed or stacked alternately and pressed. FIG. 5 shows an optical element E which includes graphite films 10' and intercalated graphite compound films 12' sandwiched between the graphite films 10' as shown.

If a desired number of graphite films and intercalated graphite compound films in number sufficient to be alternately superposed with the graphite films so that the graphite films are formed as an outermost layer on opposite sides, or if a desired number of intercalated graphite compound films are sandwiched between graphite films, a desired thickness can be readily obtained. The superposed or sandwiched films are appropriately bonded by pressing generally at a pressure of not less than 4 kg/cm². In view of the ease in fabrication, the starting graphite and intercalated graphite compound films are conveniently both in the thickness of from 4 to 200 micrometers.

The superposed or sandwiched block or sheet may be used as it is or after deposition on a curved or non-curved support through an adhesive as used in the first embodiment. If deposition is made on a curved support, it is convenient to subject the block and the support to press molding using a mold of a desired form. By this, a radiation optical element having a desired radius of curvature in conformity with the radius of the curved support is obtained.

As will become apparent from examples, the reflectivity of the block or sheet is predominantly influenced by the reflectivity of the graphite films, not of the intercalated graphite compound films. In addition, such a sheet or block has a plane distance, d, of 3.353 angstroms and is coincident with that of a graphite single crystal.

The graphite films or blocks, intercalated graphite compound films or blocks, and combinations of the graphite films and intercalated graphite compound films have been described hereinabove. Typical examples of applications of the radiation optical elements using these films or combinations are described with reference to FIGS. 6 and 7 wherein like reference numerals indicate like parts.

Figure 6:
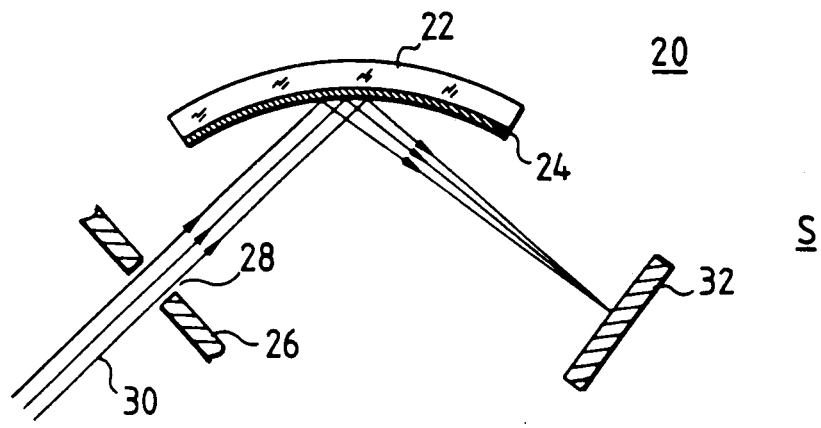
FIG. 6 is a schematic view showing an optical apparatus using the radiation optical element of FIG. 2.

FIG. 6 schematically shows an application of a radiation optical element to a convergent lens system for X-rays. In the figure, the system S includes a convergent lens 20 having a curved substrate 22 and a graphite film 24 bonded to the inner surface of the curved substrate 22. Indicated by 26 is a plate made, for example, of molybdenum having a hole 28 with a diameter of about 1 mm through which a radiation 30 such as a $CuK\alpha$ line is passed. The radiation is reflected at the convergent lens 20 and focussed on a photographic plate 32. In this manner, a fine X-ray pattern is obtained. Instead of the graphite film, the intercalated graphite compound film or the combination of the graphite and intercalated graphite compound films may be likewise used.

Figure 7:
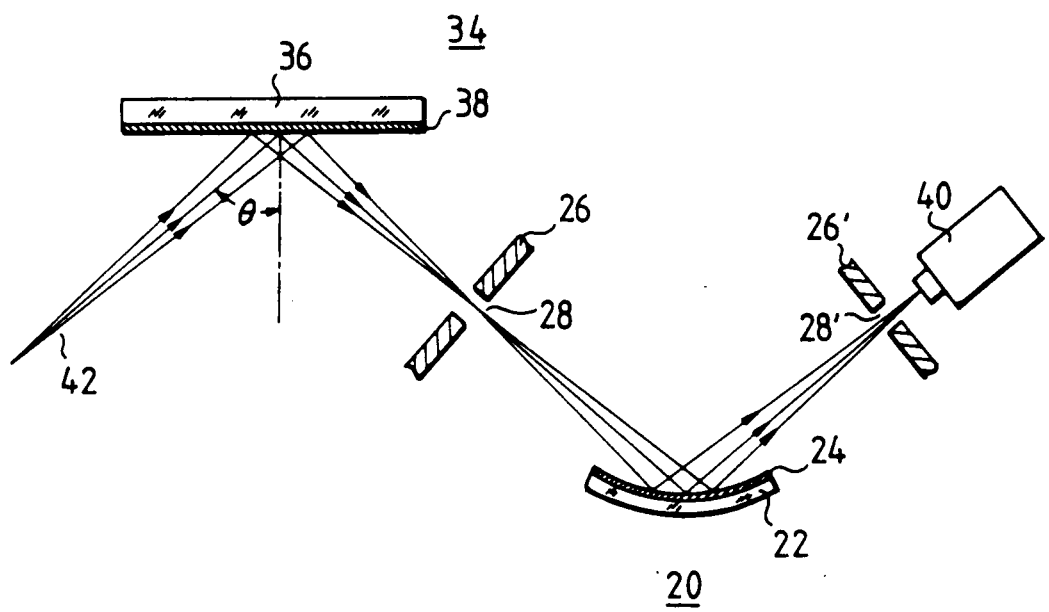
FIG. 7 is a schematic view showing an optical apparatus using the radiation optical element of FIG. 3.

FIG. 7 schematically shows an X-ray monochromater system using the film or sheet of the invention. In the figure, the monochromater is indicated as M and includes a convergent lens 20 having a curved substrate 22 and a graphite film 24 and a monochromater 34 for X-rays having a flat glass substrate 36 and a graphite film 38 formed on one side of the substrate 36. Reference numerals 26, 26' are respectively, plates having small holes 28, 28' and reference numeral 40 indicates a counter.

In operation, when an X-ray 42 is incident on the monochromater, it reflects and passes through the hole 28 of the plate 26 on the convergent lens 24. The converged ray is passed through the small hole 28' of the plate 26' and focussed into the counter 10. It will be noted that when the angle of incidence of the X-ray 42 passed to the X-ray monochromater 34 is changed, the wavelength of the X-ray passing through the small hole 28 changes.

The present invention is more particularly described by way of examples.

In examples, the lattice constant, rate of graphitization, electric conductivity and rocking characteristic were measured by the following methods.

(1) Lattice Constant (Co)

A sample was subjected to measurement of an X-ray diffraction pattern using an X-ray diffractometer, PW-1051, by Philips and an Cuk $\alpha$ line. The constant was calculated from the equation of $\lambda = 2d \sin \theta$ ($2d = Co$) using a diffraction line at (002) in the vicinity of 2 $\theta = 26°-27°$. In the equation $n = 2$ and $\lambda$ is a wavelength of the X-ray used.

(2) Rate of Graphitization

The rate was calculated from the following equation using a plane distance, d, $$d_{002} = 3.354g + 3.44(1-g)$$

where $g = 1$ means complete graphite and $g = 0$ means amorphous carbon.

(3) Electric Conductivity (S/cm)

A sample was provided with four-terminal electrodes using a silver paste and a gold wire wherein a constant current was passed from the outer electrodes to detect a voltage drop at the inner electrodes. The width, length and thickness of the sample were determined through microscopic observation, from which the electric conductivity was calculated.

(4) Rocking Characteristic

An X-ray diffractometer TU-200B made by Rigaku Denki Co., Ltd. was used to measure a rocking characteristic at a peak of the graphite (002) line. The rocking characteristic was indicated as a half-value width of the resultant absorption.

EXAMPLE 1

Films of polyphenylene oxadiazole (POD), polybenzothiazole (PBT), polybenzobisthiazole (PBBT), polybenzooxazole (PBO), polybenzobisoxazole (PBBO), polypyromellitimide (PI), polyphenylene isophthalamide (PA), polyphenylene benzoimidazole (PPBI), polyphenylene benzobisimidazole (PBBI), polythiazole (PT) and poly-p-phenylene vinylene were pyrolyzed at a temperature of 2800° C. at a pressure of 20 kg/cm² for 1 hour in argon. The resultant graphite films were subjected to measurement a lattice constant, a rate of graphitization and a rocking characteristic.

For comparison, a film of polyphenylene oxadiazole (POD) was similarly pyrolyzed at 2800° C. at a normal pressure to obtain a graphite film. This film was also measured similar to the above graphite films of the invention. Moreover, a reflection efficiency of the graphite films of the invention was determined using a CuK $\alpha$ line in relation to the reflection efficiency of the graphite film of the polyphenylene oxadiazole for comparison.

The results are shown in Table 1 below.

TABLE 1

| Type of Polymer | Lattice Constant (Å) | Rate of Graphitization (%) | Rocking Characteristic (°) | Reflection Efficiency |
|---|---|---|---|---|
| POD for Comp. | 6.708 | 100 | 6.9 | 1.0 |
| POD | 6.708 | 100 | 1.2 | 1.5 |
| PBT | 6.708 | 100 | 0.9 | 1.67 |
| PBBT | 6.710 | 98 | 1.0 | 1.74 |
| PBO | 6.710 | 98 | 0.7 | 1.71 |
| PBBO | 6.711 | 97 | 0.9 | 1.64 |
| PI | 6.709 | 99 | 0.8 | 1.89 |
| PA | 6.710 | 98 | 0.8 | 1.64 |
| PPBI | 6.709 | 99 | 0.7 | 1.74 |
| PBBI | 6.710 | 98 | 0.8 | 1.80 |
| PT | 6.712 | 97 | 1.0 | 1.81 |
| PPV | 6.709 | 99 | 0.7 | 1.97 |

The graphite film of POD for comparison has a graphitization rate of 100, but other graphite films have a graphitization rate of 100 to 97% and are thus equal or slightly inferior to the comparison film. However, the rocking characteristic of the films of the invention ranges from 1.5° to 1.97°, which is better than 6.9° of the comparative POD graphite film. In addition, the reflection efficiency is higher by 1.5 to 1.97 times than that of the POD graphite film. Thus, the graphite films of the invention are better in the characteristics as an X-ray optical element than the known POD graphite film.

EXAMPLE 2

A film of a polybenzothiazole was pyrolyzed at a temperature of 2800° C. under a pressure of 20 kg/cm² for 1 hour in argon obtain a graphite film. The resultant film had a size of 5 cm×10 cm and a thickness of 30 micrometers. This film was bonded to a curved substrate made of Cu through an epoxide adhesive as shown in FIG. 3 to make a convergent lens. This lens was used in a X-ray lens system as shown in FIG. 6 in which the plate 26 was made of molybdenum with the hole 28 having a diameter of 1 mm. When a CuK $\alpha$ line 30 was passed through the hole 28, it was reflected at the film 24 of the convergent lens 20 and converged toward a photographic plate 32 located at a focussing point. An image formed on the plate 32 was a single line with a length of 1 mm and a width of about 13 micrometers, thus being good in convergence. When passing twice through the convergent lens 20, a fine X-ray pattern with a width of 1 micrometer or below could be obtained.

EXAMPLE 3

Two films of polypyromellitimide each having a thickness of 25 micrometers were pyrolyzed at 3000° C. at a normal pressure for 1 hour to obtain 15 micrometer thick graphite films each with a size of 5 cm×5 cm. One of the films was bonded to a smooth flat glass substrate through an epoxide adhesive. Another film was used to make a convergent lens as in Example 3. These optical elements were used to assemble an X-ray monochromater system as shown in FIG. 7 wherein the plates 26, 26' were each made of molybdenum.

When an X-ray 42 from a Cu target was passed, a characteristic X-ray of CuK α was observed intensely at 13.288°. The line width was found to be 0.18°. When compared with a similar system using a natural graphite single crystal, the line width was reduced form 0.3° to 0.18°, thus revealing the high performance of the graphite of the invention.

EXAMPLE 4

10 micrometer thick PA films were each placed between quartz plates and heated at a rate of 20° C. minute in a nitrogen gas and thermally treated at 1000° C. for 1 hour. This film was sandwiched between graphite substrates and heated from room temperature at a rate of 10° C./minute and treated at a temperature of 2800° C. for 1 hour, followed by cooling at a rate of 20° C./minute. Four graphite films were hot pressed using a high temperature hot press made by Chuugai Furnace Ind. Co., Ltd. under different conditions. The resultant sheets were subjected to measurements of the lattice constant, rate of graphitization, electric conductivity and rocking characteristics with the following results.

TABLE 2

| Hot Press Conditions | | Lattice Const. Å | Rate of Graphitization % | Electric Conductivity S/cm | Rocking Characteristic ° |
|---|---|---|---|---|---|
| Temp. (°C.) | Pressure (kg/cm²) | | | | |
| 1600 | 40 | 6.710 | 99 | 14000 | 7.4 |
| 1600 | 100 | 6.710 | 99 | 15000 | 7.1 |
| 2800 | 40 | 6.708 | 100 | 19000 | 0.42 |
| 2800 | 100 | 6.708 | 100 | 19000 | 0.28 |

As will be apparent from the above results, higher temperatures and higher pressures are effective in improving the rocking characteristic. The pressing under conditions of 2800° C. and 100 hours results in a rocking value of 0.28°. When the pressing time is prolonged to 2 hours under the above conditions, the value reaches 0.26°.

EXAMPLE 5

The PA films treated at 2800° C. in the same manner as in Example 4 were hot pressed under conditions of 2800° C. 40 kg/cm². For the pressing, 10, 20, 80 and 200 graphite films were, respectively, used to obtain 38 micrometers, 110 micrometers, 380 micrometers and 1 mm. The physical properties including the rocking characteristic were similar to those of Example 4 of the invention.

EXAMPLE 6

20 films of each of PI, POD and PA, each having a thickness of 25 micrometers thermally treated and graphitized at a temperature between 1000° and 2000° C. under a pressure of 10 kg/cm², at a temperature between 2000° and 2800° C. under a pressure of 20 kg/cm² and at a temperature of 3000° C. under a pressure of 40 kg/cm², thereby obtaining graphite blocks. The characteristics of the blocks are shown in Table 3 below.

TABLE 3

| Polymer Film | Lattice Const. Å | Rate of Graphitization % | Electric Conductivity S/cm | Rocking Characteristic ° |
|---|---|---|---|---|
| PI | 6.708 | 100 | 20000 | 0.18 |
| POD | 6.708 | 100 | 18500 | 1.1 |

TABLE 3-continued

| Polymer Film | Lattice Const. Å | Rate of Graphitization % | Electric Conductivity S/cm | Rocking Characteristic ° |
|---|---|---|---|---|
| PA | 6.708 | 100 | 19000 | 1.0 |

EXAMPLE 7

This example illustrates an intercalated graphite compound film.

A 20 micrometer thick graphite film obtained by pyrolyzing a film of polyphenylene oxadiazole at 3000° C. at a normal pressure for 1 hour in Ar and 2 g of $CuCl_2$ were placed in a glass tube and sealed under vacuum, followed by reaction at 500° C. for 7 days. As a result, a first-stage $CuCl_2$-graphite intercalation compound film was obtained. This film was subjected to measurements of a position of reflection line, lattice distance, reflectivity and plane index with respect to the CuK α line (1.5418 angstroms). The reflectivity was measured by the use of an ordinary diffractometer and expressed as a ratio of a reflection intensity from plane (00 1) of the graphite intercalation compound to the strength of an incident X-ray. The lattice distance was calculated from the Bragg equation using a reflection angle (2θ) at the plane (00 1) for the CuK α line.

The results are shown in Table 4 below.

TABLE 4

| | 2θ (°) | Lattice Distance (Å) | Reflectivity (%) | Plane Index |
|---|---|---|---|---|
| $CuCl_2$-Graphite Intercalation Compound Film | 9.408 | 9.400 | 0.95 | (001) |
| | 18.881 | 4.700 | 2.1 | (002) |
| | 28.486 | 3.133 | 0.37 | (003) |

The reflection lines are those corresponding to planes (001), (002) and (003) of the graphite intercalated compound. The reflectivity was about 2% at the highest plane (002) and about 1% at (001). The half-value widths of the respective lines were each below 0.2°. Thus, the film was found to have satisfactory characteristics as an X-ray optical element.

EXAMPLE 8

A 10 micrometer thick graphite film obtained by pyrolyzing a film of polyphenylene phthalamide at 3000° C. at a normal pressure for 1 hour was placed in a glass tube and sealed under vacuum along with 2 g of $FeCl_3$, followed by reaction at 300° C. for 5 days to obtain a first-stage $FeCl_3$-graphite intercalation compound film. This film was subjected to measurements in the same manner as in Example 7. The results are shown in Table 5 below.

TABLE 5

| | 2θ (°) | Lattice Distance (Å) | Reflectivity (%) | Plane Index |
|---|---|---|---|---|
| $FeCl_3$-Graphite Intercalated Compound Film | 9.440 | 9.368 | 0.87 | (001) |
| | 18.920 | 4.690 | 2.00 | (002) |
| | 28.609 | 3.120 | 0.33 | (003) |

The reflection lines are those corresponding to planes (001), (002) and (003) of the graphite intercalation compound. The reflectivity was about 2% at the highest plane (002) and about 0.87% at (001). The half-value widths of the respective lines were all below 0.2°. Thus, this film was found to have satisfactory characteristics for use as an X-ray optical element.

EXAMPLE 9

A 25 micrometer thick graphite film obtained by pyrolyzing a film of polypyromellitimide at 3000° C. at a normal pressure for 1 hours in vacuum and 2 g of $TaCl_5$ were placed in thionyl chloride and reacted at 60°C. for 10 days while passing an argon gas, thereby obtaining a second-stage $TaCl_5$-graphite intercalation compound film. This film was subjected to measurements in the same manner as in Example 7. The results are shown in Table 6 below.

TABLE 6

|  | 2θ (°) | Lattice Distance (Å) | Reflectivity (%) | Plane Index |
|---|---|---|---|---|
| $TaCl_5$-Graphite Intercalated Compound Film | 6.882 | 12.844 | 0.63 | (001) |
|  | 13.797 | 6.418 | 0.58 | (002) |
|  | 20.754 | 4.280 | 1.61 | (003) |
|  | 27.790 | 3.210 | 1.54 | (004) |

The reflection lines are those corresponding to planes (001), (002), (003) and (004) of the graphite intercalation compound. The reflectivity was about 1.5% at the highest planes (003) and (004) and 0.6% at (001). The half-value widths of the respective lines were all below 0.3°. Thus, the film was satisfactory for use as an X-ray optical element.

EXAMPLE 10

20 micrometer thick graphite films obtained by pyrolyzing films of polyphenylene oxadiazole and 4 g of $CuCl_2$ were sealingly placed in a glass tube under vacuum and reacted at 500° C. for 7 days to obtain first-stage $CuCl_2$-graphite intercalation compound films. Seventy five films were superposed and pressed under a pressure of 50 kg/cm² to obtain an about 3 mm thick graphite intercalation compound block. This block was subjected to measurement of a tensile shearing stress by the use of a tensile tester, revealing that the adhesion strength of the block was 1 kg/cm². The block was subjected to measurements of the position of the reflection line, lattice distance, reflectivity and plane index in the same manner as in Example 7. The results are shown in Table 7 below.

TABLE 7

|  | 2θ (°) | Lattice Distance (Å) | Reflectivity (%) | Plane Index |
|---|---|---|---|---|
| $CuCl_2$-Graphite Intercalated Compound Block | 9.408 | 9.400 | 1.51 | (001) |
|  | 18.881 | 4.700 | 3.5 | (002) |
|  | 28.486 | 3.133 | 0.64 | (003) |

The reflection lines are those corresponding to the planes (001), (002) and (003). The plane distance was the same as that of a single graphite intercalation compound film. The reflectivity was about 3.5% at (002) and about 1.5% at (001), which were higher than those of the single graphite intercalation compound film. The half-value widths of the respective lines were all 0.25° and were thus inferior to the values of the single film. Nevertheless, the block was sufficient for use as an X-ray optical element.

EXAMPLE 11

This example illustrates application of a graphite intercalation compound block as a convergent lens as shown in FIG. 6.

One hundred and fifty graphite films intercalated with $CuCl_2$, each having a size of 5 cm × 10 cm and a thickness of 20 micrometers, were superposed and press molded to have a curvature coinciding with a curved support thereby forming a a lens having a 3 mm thick block on the support. The graphite used was made from polypyromellitimide. Substantially in the same manner as in Example 2, a CuK α line was passed through a Mo plate 28 with a diameter of 1 mm toward the lens fabricated above as 20 and focussed on a photographic plate 32 to form an image of a single line with a 1 mm and a width of about 15 micrometers on the plate 32. When the converging system was arranged to allow the line to converge twice, there was obtained a fine pattern with a width of not larger than 1 micrometer.

EXAMPLE 12

The general procedure of Example 3 was repeated except that an X-ray monochromater was made as follows. One hundred and fifty $CuCl_2$-graphite intercalation compound films were superposed and pressed at a pressure of 20 kg/cm² to obtain an about 3 mm thick block with a size of 5 cm × 5 cm and this block was bonded to a glass substrate. The graphite used was obtained from polypyromellitimide. When an X-ray from a Cu target was passed, a characteristic X-ray of CuK α was intensely observed at θ = 4.704°. The line width was 0.2°.

As will be apparent from the above, when the graphite intercalation compound was used as a radiation optical element, a plane distance of about 10 Å can be attained which would be difficult when using known multi-layered films. This means that there can be obtained a radiation optical element for soft X-rays with a wavelength of about 10 angstroms.

EXAMPLE 13

50 polyphenylene oxadiazole films were pyrolyzed at a temperature of 3000° C. for 30 minutes to obtain graphite films each having a thickness of 20 micrometers. On the other hand, 40 micrometer thick graphite films were obtained from 49 polyphenylene oxadiazole films under conditions as used above. These graphite films were intercalated with $CuCl_2$ to obtain forty nine first-stage $CuCl_2$-graphite intercalation compound films. The intercalated graphite films were, one by one, inserted inbetween the graphite films for alternate superposition, followed by pressing at a pressure of 50 kg/cm², thereby obtaining a superposed graphite block having a thickness of about 3 mm.

This block was subjected to measurement of reflection line positions for CuK α (1.5418 angstroms), relative intensities to a reflection intensity at plane (002) of the graphite plate taken as 100, and plane indexes. The results are shown in Table 8 below.

TABLE 8

|  | 2θ (°) | Relative Intensity | Plane Index |
|---|---|---|---|
| Graphite | 26.576 | 100 | (002) |
|  | 54.734 | 5.2 | (004) |
|  | 87.187 | 0.6 | (006) |
| CuCl$_2$-Graphite Intercalated Compound | 9.408 | 0.95 | (001) |
|  | 18.881 | 2.1 | (002) |
|  | 28.486 | 0.37 | (003) |

The reflection lines are those corresponding to planes (001), (002) and (003) of the graphite intercalation compound and those corresponding to planes (002), (004) and (006) of the graphite. The reflection intensity is predominantly intense for the line corresponding to plane (002) of the graphite. The reflection angle (2θ) of the graphite was 26.576° with a plane distance, d, of 3.354 Å, coinciding with those of a graphite single crystal. The half-value width was 0.2° and thus, the graphite plate has satisfactory characteristics as an X-ray optical element.

EXAMPLE 14

Example 13 was repeated thereby making a graphite block. This block was press molded using a cylindrical tool having such a curvature as a curved substrate. The molded block was bonded to the curved substrate to make a converging lens.

This lens was applied to a system as shown in FIG. 6. When a CuK α line 30 was passed through the hole 28 of the molybdenum plate 26 and focussed through the lens 20 on the photographic plate 32. A single line image was obtained with a length of 1 mm and a width of about 15 micrometers. Thus, the lens had good convergence. When the CuK α line 30 was passed twice through the lens 20, a fine pattern with a width of 1 micrometer or below could be obtained.

EXAMPLE 15

In the same manner as in Example 14 an about 3 mm thick superposed block was made and attached to a flat glass substrate to make an X-ray monochromator.

This monochromater was assembled in a system as shown in FIG. 7. When the angle θ of the incidence of the X-ray 42 was changed, the wavelength of the X-ray 42 passing through the hole 28 of the Mo plate could be changed. After the passage though the hole 28, the X-ray was directed toward a convergent lens as used in Example 12 at which it was changed in direction to pass through the hole 28′ and focussed into the counter 40.

When an X-ray from a Cu target was passed, a characteristic X-ray of CuKα was intensely observed at θ =13.288°. The line width was 0.2°. When comparing with the case where a natural graphite single crystal, the line width was reduced from 0.3° to 0.2°. Thus, the superposed graphite plate was confirmed to have good properties.

EXAMPLE 16

Polyphenylene oxadiazole films were thermally treated at 3000° C. for 30 minutes in vacuum to obtain 20 micrometers thick graphite films. Part of the graphite films was used to make a first-stage CuCl$_2$-graphite intercalation compound films each with a thickness of 40 micrometers. The graphite films and the intercalation compound films were superposed as shown in FIG. 5 in such a way that 25 intercalation compound films were placed on one graphite film. Three layers of the above combination were superposed so that upper and lower films were the graphite films and pressed at a pressure of 50 kg/cm$^2$, thereby obtaining an about 3 mm thick graphite block serving as a radiation optical element. This block was subjected to measurements of reflection line positions, lattice distance, reflectivity and plane index. The results are shown in Table 9 below.

TABLE 9

|  | 2θ (°) | Lattice Distance (Å) | Reflectivity (%) | Plane Index |
|---|---|---|---|---|
| Graphite | 26.576 | 3.354 | 4.18 | (002) |
|  | 54.734 | 1.677 | 0.20 | (004) |
|  | 87.187 | 1.118 | 0.03 | (006) |
| CuCl$_2$-Graphite Intercalation Compound Film | 9.408 | 9.400 | 1.51 | (001) |
|  | 18.881 | 4.700 | 3.5 | (002) |
|  | 28.486 | 3.133 | 0.64 | (003) |

The reflection lines are those corresponding to planes (001), (002) and (003) of the graphite intercalation compound and those corresponding to planes (002), (004) and (006) corresponding to the graphite. The reflectivity at the line corresponding to plane (002) of the graphite films and the reflectivity at the line corresponding to plane (002) of the intercalation compound films are substantially the same. The reflection angle (2θ) at plane (002) of the graphite films is 26.576° with a plane distance, d, of 3.354 Å, coinciding with those of a graphite single crystal. The plane distance calculated from the lines of the intercalation compound is substantially the same as that of a single film.

The half-value width was 0.2° for the (002) line of the graphite, and 0.3° for the (001) line and 0.27° for the (002) line of the intercalation compound. Thus, the block obtained in this example was satisfactory in the characteristics for use as an X-ray optical element.

In the above examples 13 to 16, graphite films obtained from polyphenylene oxadiazole are described. It should be noted when graphite films obtained from other polymer films indicated in Tables 1 and 2 and graphite intercalation compound films made of graphite films made from polyimide and metal halides are used, similar results are obtained. Moreover, application of the elements to X-rays has been described, the elements are also applicable as a monochromater, analyzer, lens or film for neutron spectroscopy.

What is claimed is:

1. An optical element which is adapted for use in a radiation optical system having a radiation source and a means for receiving radiation generated from the radiation source and passing through the optical element, said optical element comprising a graphite film obtained by pyrolyzing a film of a polymer selected from the group consisting of polyphenylene oxadiazole, polybenzothiazole, polybenzobisthiazole, polybenzooxazole, polybenzobisoxazole, polypyromellitimide, polyphenylene-isophthalamide, polyphenylene-benzoimidazole, polyphenylene-benzobisimidazole, polythiazole and poly-p-phenylene-vinylene at a first temperature of not higher than 2800° C. and at a first pressure of not higher than 20 kg/cm$^2$, and subsequently at a second temperature higher than 2800° C. and at a second pressure higher than 20 kg/cm$^2$.

2. An optical element according to claim 1, wherein said polymer is polyphenylene oxadiazole.

3. An optical element according to claim 1, wherein said polymer is polypyromellitimide.

4. An optical element according to claim 1, wherein said graphite film is formed on to a flat substrate.

5. An optical element according to claim 1, wherein said graphite film is formed on a cylindrically curved substrate on the inner surface thereof.

6. An optical element according to claim 1, wherein a plurality of said polymer films are stacked to provide a block of graphite films.

7. An optical element according to claim 1, wherein a plurality of graphite films which have been obtained by pyrolyzing a plurality of polymer films at a temperature of not lower than 2800° C. under a pressure of not lower than 4 kg/cm$^2$, are combined to provide a graphite block.

8. An optical element which is adapted for use in a radiation optical system having a radiation source and a means for receiving a radiation generated from the radiation source and passing through an optical element, said optical element comprising a graphite film which is obtained by pyrolyzing at a temperature of not lower than 2800° C., in vacuum or in an inert gas, a film of a polymer selected from the group consisting of polyphenylene oxadiazole, polybenzothiazole, polybenzobisthiazole, polybenzooxazole, polybenzobisoxazole, polypyromellitimide, polyphenylene isophthalamide, polyphenylene benzoimidazole, polyphenylene benzobisimidazole, polythiazole and poly-p-phenylenevinylene and which has a metal halide intercalated therein.

9. An optical element according to claim 8, wherein said metal halide is intercalated in a first-stage condition where said metal halide is present in individual space between any adjacent lattice layers of said graphite film.

10. An optical element according to claim 8, wherein said metal halide is intercalated in a second-stage condition where said metal halide is present in every third space of lattice layers of said graphite film.

11. An optical element according to claim 8, wherein said metal halide is at least one member selected from the group consisting of BCl$_3$, MgCl$_2$, AlCl$_3$, ScCl$_3$, TiCl$_4$, CrCl$_3$, MnCl$_2$, FeCl$_3$, CoCl$_2$, NiCl$_2$, CuCl$_2$, ZnCl$_2$, GaCl$_3$, YCl$_3$, NbCl$_5$, MoCl$_5$, RhCl$_3$, PdCl$_2$, CdCl$_2$, RuCl$_3$, ZrCl$_4$, InCl$_3$, HfCl$_4$, TaCl$_5$, WCl$_6$, ReCl$_4$, OsCl$_4$, PtCl$_4$, AuCl$_3$, HgCl$_2$, TlCl$_3$, BiCl$_4$, ICl, IBr, FeCl$_2$, BF$_3$, AlBr$_3$, SiF$_4$, TiF$_4$, FeBr$_3$, CuBr$_2$, PF$_6$, GaBr$_3$, NbF$_5$, MoF$_6$, CdBr$_2$, TaF$_6$, WF$_6$, OsF$_3$, AuBr$_3$ and TlBr$_3$.

12. An optical element according to claim 11 wherein said metal halide is CuCl$_2$.

13. An optical element according to claim 11, wherein said metal halide is NiCl$_2$.

14. An optical element according to claim 8, wherein a plurality of the intercalated graphite films are bonded together to form a sheet or block.

15. An optical element according to claim 8, wherein the intercalated graphite film is formed on a flat substrate.

16. An optical element according to claim 8, wherein intercalated graphite film is formed on a curved substrate at the inner side thereof.

17. An optical element which is adapted for use in a radiation optical system having a radiation source and a means for receiving a radiation generated from the radiation source and passing through an optical element, said optical element comprising at least one graphite film and at least one graphite film intercalated with a metal halide, both films being bonded together by pressing.

18. An optical element according to claim 17, wherein a plurality of the graphite films and a plurality of the intercalated graphite films which are alternately superposed and bonded together by pressing to form a sheet so that the graphite films are placed as an outermost layer on opposite sides.

19. An optical element according to claim 17, wherein a plurality of intercalated graphite films are sandwiched between two graphite films and bonded together by pressing to form a sheet.

20. An optical element according to claim 17, wherein said at least one graphite film is obtained by pyrolyzing at a temperature of not lower than 2800° C. at a normal pressure in vacuum or in an inert gas a film of a polymer selected from the group consisting of polyphenylene oxadiazole, polybenzothiazole, polybenzobisthiazole, polybenzooxazole, polybenzobisoxazole, polypyromellitimide, polyphenylene-isophthalamide, polyphenylene-benzoimidazole, polyphenylene-benzobisimidazole, polythiazole and poly-p-phenylenevinylene.

21. An optical element according to claim 17, wherein said at least one graphite film is obtained by pyrolyzing at a temperature of not lower than 2800° C. at a pressure of not lower than 4 kg/cm$^2$ in vacuum or in an inert gas a film of a polymer selected from the group consisting of polyphenylene oxadiazole, polyimide, polybenzothiazole, polybenzobisthiazole, polybenzooxazole, polybenzobisoxazole, polypyromellitimide, polyphenylene-isophthalamide, polyphenylene-benzoimidazole, polyphenylene-benzobisimidazole, polythiazole and poly-p-phenylene-vinylene.

22. An optical element according to claim 17, wherein said at least one graphite film intercalated with the metal halide is a product which is obtained by pyrolyzing at a temperature of not lower than 2800° C. in vacuum or in an inert gas a film of a polymer selected from the group consisting of polyphenylene oxadiazole, polybenzothiazole, polybenzobisthiazole, polybenzooxazole, polybenzobisoxazole, polypyromellitimide, polyphenylene-isophthalamide, polyphenylene-benzoimidazole, polyphenylene-benzobisimidazole, polythiazole and poly-p-phenylene-vinylene and intercalating the resultant graphite film with a metal halide.

23. An optical element according to claim 22, wherein said metal halide is at least one member selected from the group consisting of BCl$_3$, MgCl$_2$, AlCl$_3$, ScCl$_3$, TiCl$_4$, CrCl$_3$, MnCl$_2$, FeCl$_3$, CoCl$_2$, NiCl$_2$, CuCl$_2$, ZnCl$_2$, GaCl$_3$, YCl$_3$, NbCl$_5$, MoCl$_5$, RhCl$_3$, PdCl$_2$, CdCl$_2$, InCl$_3$, HfCl$_4$, TaCl$_5$, WCl$_6$, ReCl$_4$, OsCl$_4$, PtCl$_4$, AuCl$_3$, HgCl$_2$, TlCl$_3$ and BiCl$_4$.

24. An optical element according to claim 17, wherein the bonded films are formed on a flat substrate.

25. An optical element according to claim 17, wherein the bonded films are formed on a cylindrically curved substrate.

* * * * *